July 2, 1929.  J. A. DIENNER  1,719,502
HYDRAULIC TRANSMISSION SYSTEM
Filed March 10, 1920   2 Sheets-Sheet 1
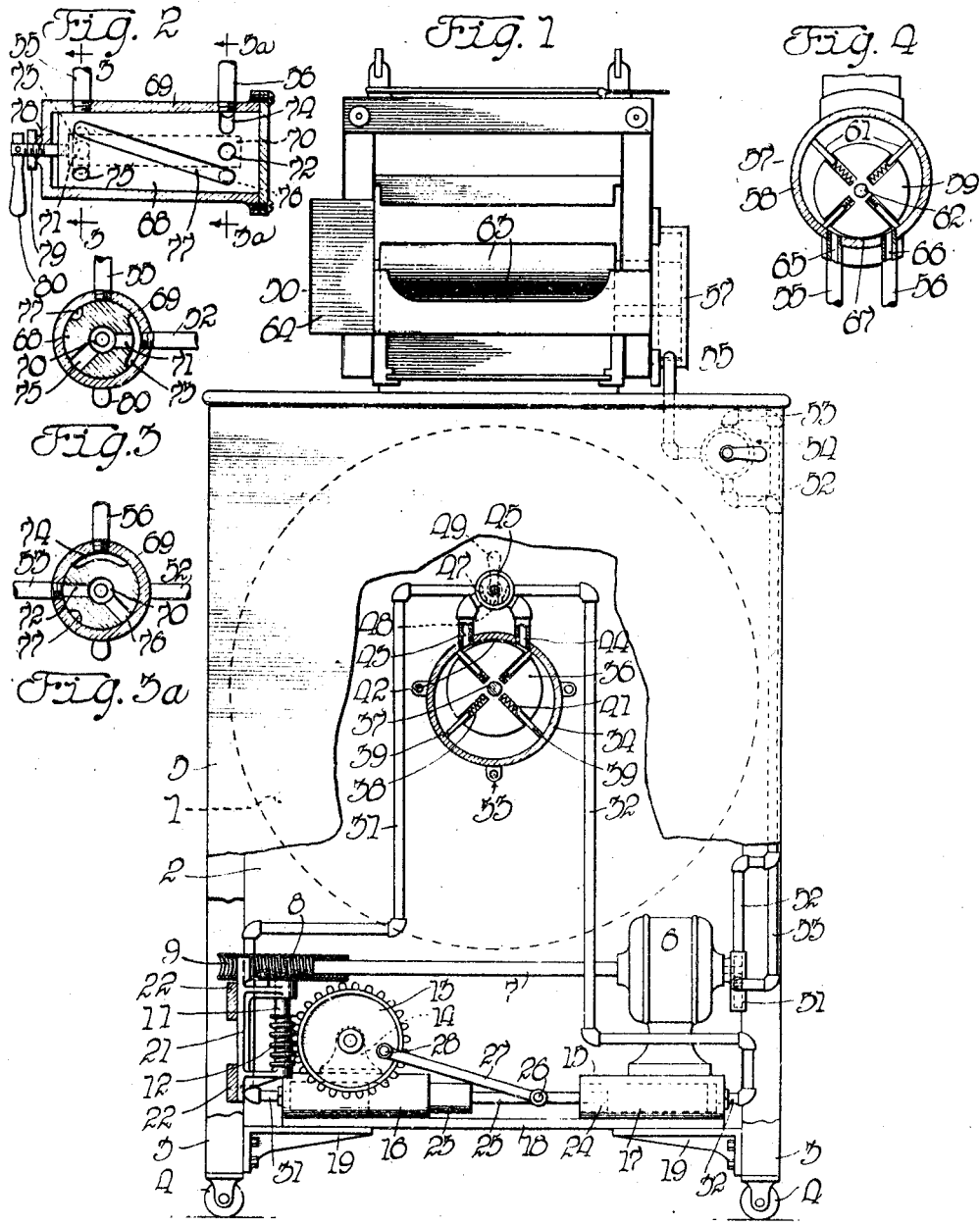

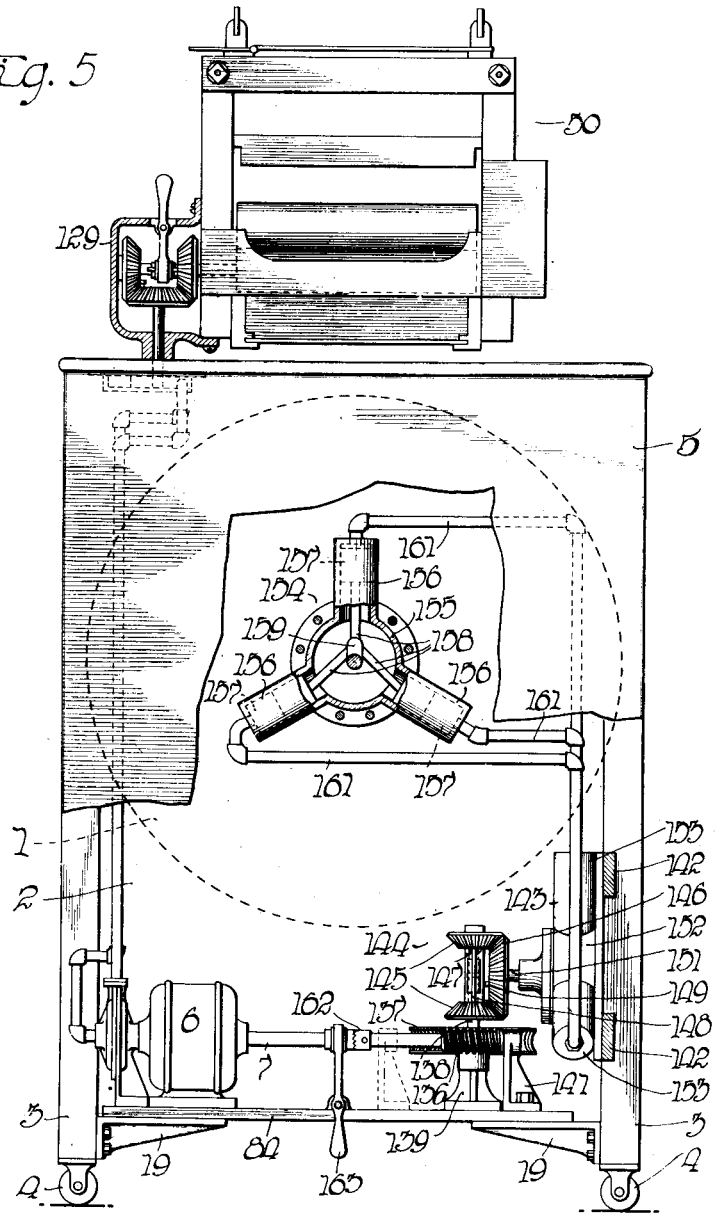

Patented July 2, 1929.

1,719,502

UNITED STATES PATENT OFFICE.

JOHN A. DIENNER, OF CHICAGO, ILLINOIS.

HYDRAULIC TRANSMISSION SYSTEM.

Application filed March 10, 1920. Serial No. 364,832.

My invention relates to washing machines and has particular reference to an improved and simplified transmission mechanism for connecting the electric motor (or other source of power) with the washing mechanism and with the wringer mechanism.

The invention is primarily directed to the end of providing an improved system of power transmission for washing machines which will dispense with the necessity for all shafts and gears between the motor and the washer and wringer mechanisms. The disadvantages of the shaft and gear system of transmission are numerous: First, the shaft and gear system of transmission is inherently unsuited to deriving a periodically reversing rotation for the washer cylinder, such as is required in the reversing cylinder types of machines. This follows from the fact that a periodically reversing motion having a point of zero motion at reverse, is not a natural function of any combination of gears and clutches.

A second disadvantage of the shaft and gear system of transmission lies in the fact that it is not adapted to effecting large speed reductions, such as are required between the driving motor and the washer and wringer mechanisms, without involving a large power loss and an objectionable degree of noise and vibration.

A third disadvantage of the shaft and gear system of transmission is the fact that this form of transmission necessitates aligned bearings between the different operating units of the machine. The necessity for these aligned bearings contributes in a large measure to the assembly cost of the machine, and also to the maintenance cost, owing to the necessity of re-aligning the bearings when making repairs or renewals of worn and broken parts. From the fact that a domestic washing machine must essentially be of light weight and inexpensive construction, it will be evident that the problem of mounting bearings and shafts on the machine and maintaining them in alignment presents a considerable difficulty. The use of a heavy, rugged frame structure, possibly with the addition of a mounting plate for supporting the various shaft bearings, results in a construction which is exceedingly heavy and quite expensive to manufacture. On the other hand, the use of a relatively light frame structure, such as of wood, upon which the bearings are directly mounted, results in a construction which is subject to distortion from the strains and vibrations developed in the machine, with the consequent disalignment and wear of the shafts and bearings. Furthermore, owing to the requirement for accurately aligned bearings in this construction of machine, "bench assembly" of the several operating units is made impracticable, and consequently these units and the entire machine, must be "floor assembled," which is a more difficult and expensive operation.

The present form of transmission is a radical departure from this previous practice, and substantially obviates the above disadvantages. According to the present invention, the transmission of power is effected entirely through a body of fluid—in the nature of a hydraulic transmission. This is accomplished by utilizing the electric motor to drive a fluid pump which is adapted to circulate or pulsate a power transmitting fluid through a fluid circuit or a closed fluid column. Included in this fluid circuit or column is a fluid motor which operates to drive the washer mechanism under the power impulses transmitted through the body of fluid. Such system of transmission is uniquely adapted to deriving a periodically reversing rotation for driving the washer mechanism. By reason of the mobility of the body of fluid, its small frictional loss and its small mass inertia, a periodically reversing direction of flow may be mechanically imparted to the body of fluid with maximum efficiency and with the substantial elimination of all noise and vibration. In one embodiment of my invention, this reversing flow of the body of fluid is accomplished by creating slow pressure pulsations in alternating directions, through the medium of a pulsator interposed in the fluid column. The pressure pulsation of the fluid column in one direction forces a volume of fluid through the fluid motor and thereby produces a continuous rotation of the washer mechanism for a period of several revolutions. Upon a reverse reciprocation of the pulsator, a reverse pressure pulsation is created in the fluid column, thereby forcing a volume of the fluid through the fluid motor in the reverse direction and resulting in a reverse rotation of the washer mechanism through a similar number of revolutions in the other direction. A further embodiment of this fluid transmission mechanism employing a plurality of independent fluid columns between the driving motor and the washer mechanism, is described in the appended specification. The fluid transmission mechanism between the electric motor and the wringer mechanism preferably embodies the same general relation of fluid pump and fluid motor connected by a closed fluid circuit, as above described. In this transmission system, however, the flow is normally uni-directional, so as to normally drive the wringer in one direction. The reversal of the drive to the wringer may be accomplished by a reversing valve interposed in the fluid circuit or by a mechanical reverse interposed in the mechanical connections.

A particular advantage residing in the use of fluid as the power transmitting medium is the ability to effect large reductions in speed by simply proportioning the relative capacities of the fluid pump and fluid motor in the ratio of the desired speed reduction. For example, a speed reduction of 1 to 40 may be obtained by simply proportioning the displacement capacities of the pump and motor in the ratio of 1 to 40. By utilizing this principle I am enabled to dispense with all gearing in the transmission mechanism, with the consequent elimination of substantially all noise and vibration, which is usually characteristic of reduction gearing.

A further advantage residing in the use of a body of fluid as the power transmitting medium is the fact that all necessity for aligned shafts and bearings between the different operating units of the machine is thereby eliminated. This permits of a bench assembly of each of the operating units of the machine. Furthermore, in the event of breakage or wear of any of the operating parts of the transmission mechanism a renewal of this operating part can be readily effected by the simple substitution of the parts without requiring that the machine can be returned to the factory for accurate alignment of the new operating unit with the rest of the transmission mechanism. The maintenance and repair costs are consequently very much simplified and reduced, which is a relatively important factor in the case of washing machines, owing to the wide distribution of the machines and the practical difficulties involved in returning the machines to the factory for repairs.

Referring to the accompanying drawings, wherein I have illustrated various preferred constructions of my improved washing machine:

Figure 1 is an end view of a washing machine embodying my improved fluid transmission mechanism, the end cover plate of the machine being broken away to illustrate the operative relation of the transmission system;

Figure 2 is an enlarged longitudinal sectional view of the fluid control valve for the wringer motor;

Figure 3 is a transverse sectional view of the same, taken on the plane of the line 3—3 of Figure 2.

Figure 3^A is a similar view taken on the plane of the line 3^A—3^A of Figure 2;

Figure 4 is a vertical sectional view of the fluid motor for driving the wringer.

Figure 5 is a view similar to Figure 1, illustrating a modified form of transmission system for the washer mechanism.

Referring to Figure 1, the invention is illustrated as being embodied in a washing machine of the reversing cylinder type, although adaptations to other types of washing machines are also contemplated. It will be understood, of course, that the fluid transmission mechanism for the wringer may be adapted to any type of machine.

The reversing cylinder which is indicated by the dotted circle 1, is contained in a tank 2 mounted in a frame work constructed of angle iron, and comprising particularly the angle iron corner posts 3, which are provided at their lower ends with suitable rollers 4. The transmission mechanism is preferably supported at one end of the machine as illustrated, although it will be apparent that the mechanism may be grouped on one side of the machine if desired. The tank 2 is not extended entirely to the wringer end of the machine (which is the end shown), but is spaced therefrom to provide an intervening space 10 in which is confined the transmission mechanism. An outer facing plate 5, which is preferably removable or is hinged in order to be swung out of the way, is provided for covering the end of the machine and for enclosing the transmission mechanism.

Referring first to the transmission system for the washer mechanism, it will be observed that the electric motor 6 has driving connection through a shaft 7 with a worm 8 supported at one side of the machine. This worm meshes with a worm wheel 9, which operates to drive the short vertical shaft 11 at a reduced speed. On the lower end of the shaft 11 is mounted a second worm 12, which meshes with a second worm wheel 13 mounted vertically with respect to the machine. The shaft of the worm wheel 13 is journaled in a bearing 14, which is supported on one of the cylinders of a pulsator 15. This pulsator comprises a pair of opposed cylinders 16 and 17 which are mounted upon a common base 18. The base 18 is supported upon brackets 19—19, which are bolted to the corner legs 3. Upon the right hand cylinder 17 is mounted the electric motor 6. A bearing bracket 21 is provided for affording bearing support for the end of the motor shaft 7, and for the short worm shaft 11. This bearing bracket may be mounted on the transverse frame members 22, or upon the pulsator structure similarly to the bearing 14.

Mounted for reciprocation in the opposed pulsator cylinders 16 and 17 are the two plunger pistons 23 and 24, which are connected by the piston rod 25. This piston rod has connection through a lateral pin 26 with a connecting link 27, which has pivotal connection at its opposite end with a crank pin 28 on the face of the worm wheel 13. Both of the pulsator cylinders 16 and 17 have communication with pipes 31 and 32 respectively, which thread into port openings tapped in the heads of the cylinders. These pipes 31 and 32 extend up to the fluid motor 33, which has driving connection with the end trunnion of the cylinder 1.

The fluid motor 33 may be of any preferred type, being preferably positive in action, however. I have illustrated a vane motor as being the preferred form of fluid motor, but I wish it to be understood that I also contemplate employing a rotary gear motor consisting of two meshing gear wheels, or a rotary eccentric motor, or practically any preferred form of fluid motor which is suitable to the present adaptation. The vane motor illustrated comprises an outer circular housing 34, which is mounted upon the frame structure of the machine, or upon a mounting plate at the end of the tank 2.

The housing 34 is closed off at front and rear by end plates, thereby forming a shallow cylindrical chamber, and journaled eccentrically in this chamber is a rotor 36. The rotor shaft 37 is extended out through the rear wall of the housing 34 and has suitable driving connection with the end trunnion of the cylinder 1. Formed in the body of the rotor member 36 are a plurality of radial slots 38 in which are guided a plurality of vanes 39. These vanes are normally impelled outwardly against the walls of the housing 34 by compression springs 41 of suitable form, which are confined in the slots 38 in rear of the vanes. The periphery of the rotor member 36 is arranged to contact with the inner wall of the housing 34 as indicated at 42. The fluid ports 43 and 44 which open into the interior of the motor are disposed upon opposite sides of this point of contact 42 so as to cause a circulation of the motive fluid around the rotor 36 and in contact with each of the rotor vanes 39. The fluid pipes 31 and 32 have communication with the ports 43 and 44 through a by-pass valve 45. This valve comprises a cylindrical or tapered valve member disposed in an outer housing in which are formed ports communicating with each of the pipes 31 and 32, and also with the pipes leading to the fluid ports 43 and 44 of the motor. Formed in the periphery of the valve member is a pair of grooves 47—47, which—in one position of the valve—are adapted to place the pipes 31 and 32 in communication with the fluid ports 43 and 44 respectively. Extending diametrically through the body of the valve is a transverse port 48 which, in the other position of the valve, is adapted to register with each of the pipes 31 and 32 and by-pass the pressure pulsations around the fluid motor, so that no rotation of the latter will result. The shaft of the by-pass valve 45 is extended out through the end plate 5, where it is provided with an operating handle 49 by which the operation of the washer mechanism may be controlled. This operation is as follows:

Assume that the control handle 49 has been thrown to the "on" position, and that the electric motor 6 has been started. The high speed rotation of the motor shaft 7 is first reduced through the worm 8 and worm wheel 9, and is again reduced through the worm 12 and worm wheel 13 so that there is a comparatively slow reciprocation transmitted through the connecting link 27 to the pistons 23 and 24. The speed of this reciprocating motion is preferably in the neighborhood of four or five reciprocations per minute. This slow reciprocating motion creates alternating pressure pulsations in the closed fluid column which is in circuit with the pulsator, and thereby induces a periodically reversing flow of fluid through the fluid motor 33. The action of these alternating pressure pulsations is to revolve the fluid motor a number of revolutions in one direction and then reverse the fluid motor and revolve it an equal number of revolutions in the other direction.

The closed liquid column constitutes in its entirety the cylinder 17, the pipe 32, the interior of the fluid motor 33, the pipe 31, and the other cylinder 16. This closed chamber is substantially filled with a suitable liquid, preferably a medium heavy grade of lubricating oil. The lubricating qualities of the oil automatically insure the lubrication of all of the operating parts which are included in the fluid column. It will be understood that, because of the slow reciprocation of the pulsator 15 the pressure surge of the fluid into the fluid motor through either of the ports 43 or 44 is at a relatively low velocity, but under considerable pressure. Consequently, the building up of pressure behind each of the vanes 39 is comparatively slow, and as a result the fluid motor is revolved at a relatively low speed, which is a desirable characteristic for driving the washer cylinder 1. It should be noted that the volumetric capacity of the fluid motor 33 is considerably smaller than that of either of the cylinders 16 or 17. The proportion is preferably in the ratio of 1 to 4 or 1 to 5, whereby the entire pressure pulsation in one direction from one of the cylinders 16 or 17 will result in four or five complete revolutions of the fluid motor.

It will be apparent that the reversal of the fluid motor 33 is effected gradually and without shock; first, by reason of the dead center areas in the position of the crank pin 28, which insure a gradual building up of the fluid pressure and its gradual cessation before reversal; and second, by reason of the natural cushioning action of the oil column. I contemplate increasing this cushioning property of the oil column by interposing an air bubble in the column or by providing a suitable air trap or pressure chamber in communication with the column.

Referring now to the fluid transmission mechanism for driving the wringer 50, it will be noted that on the other end of the shaft of the electric motor 6 is coupled a small gear pump 51. This gear pump consists of a pair of small meshing spur gears enclosed in a tightly fitting casing having intake and outtake ports aligned with the point of intersection of the gears. I have illustrated the use of this type of pump in the wringer transmission mechanism because of the extremely small volumetric displacement which it is possible to obtain in the small units of this type, and also because of its positive action, but I wish it to be understood that I also contemplate employing a vane, or rotary eccentric type of pump, or even a centrifugal pump, as I shall hereinafter describe. Leading from the intake and outtake ports of the pump 51 are two pipes 52 and 53, which extend up to a control valve 54, which is mounted in back of the end plate 5 and adjacent the top of the machine. The pipes 52 and 53 enter the valve housing at diametrically opposite points; and extending from the valve housing at a point intermediate the two pipes 52 and 53 are two pipes 55 and 56 which have connection with the fluid motor 57 for driving the wringer 50. The fluid motor 57 is preferably of the rotary vane type, although, as remarked of the fluid motor 33, it might also be of the eccentric type, or even consist of a large gear pump employed in the relation of a fluid motor. This vane motor 57 is constructed similarly to the vane motor 33, and comprises an outer circular housing 58, which is suitably bolted or otherwise secured on the side frame member of the wringer 50. Journaled eccentrically in the housing 58 is the rotor 59, which is provided with its usual series of spring pressed vanes 61—61. The shaft 62 of the rotor 59 has direct mechanical connection with the shaft of the lower wringer roller 63, it being understood that both wringer rolls 63 are positively geared together by gears enclosed in the gear housing 64. The fluid pipes 55 and 56 communicate with the interior of the motor housing 58 through ports 65 and 66, which open into the motor housing upon opposite sides of the point of contact 67 of the rotor 59 with the motor housing 58. The motor 57 is designed to have a relatively large volumetric displacement, as compared with that of the gear pump 51, so that a large speed reduction is effected between the pump 51 and the motor 57. It will be apparent that the displacement capacity of the motor 57 will increase as the square of the diameter of the motor chamber and in direct ratio with the axial dimension of the motor chamber. By proportional increase in each dimension the capacity of the motor can thus be increased as the cube. Therefore, by designing the motor 57 of a comparatively large diameter and increasing the length of the motor chamber over that of ordinary stock design, the capacity of the motor can be made quite large without encumbering or obstructing access to the wringer rolls 63. The large capacity of the motor 57 in combination with the extremely small displacement capacity of the gear pump 51 insures the obtaining of a large speed reduction, whereby the wringer rolls 63 can be driven at their proper speed, which is generally in the neighborhood of 35 or 40 revolutions per minute.

The operation of the wringer and the direction of rotation of its rolls are controlled by the control valve 54, which is illustrated in section in Figures 2 and 3.

Figure 2 represents a horizontal sectional view of the valve, and as will be noted therefrom, the valve member 68 consists of a tapered valve plug which is enclosed in a tapered circular housing 69. The two fluid pipes 52 and 53 leading up from the pump 51 tap into the valve housing 69 at diametrically opposite points in the vertical plane of the valve and at opposite ends of the valve plug 68. The two fluid pipes 55 and 56 leading up to the motor 57 tap into the valve housing 69 in the horizontal plane of the valve and at opposite ends thereof. The valve plug 68 is cored out hollow, as indicated at 70, and communicating with this cored opening at opposite ends of the valve plug are the two valve ports 71 and 72, which open out on opposite sides of the valve plug 68. It will be apparent that when the valve plug 68 is put into a position placing the ports 71 and 72 in registration with the fluid pipes 52 and 53, there will be a by-path circulation of the fluid from the pump 51 through the central cored passage 70. In this position of the valve the fluid motor 57 is not in operation. In the same plane with the two valve ports 71 and 72 are formed two shallow grooves 73 and 74. Each of these grooves extends substantially 90 deg. about the circumference of the valve plug, the two grooves being displaced substantially 90 deg. from each other with respect to the circumference of the valve plug. The port 71 is disposed substantially in the center of the groove 73. A third port opening 75 communicating with the cored passage 70 is disposed in the plane of the port opening 71, this latter port opening being removed substantially 135 deg. from the port opening 71. A fourth opening 76, communicating with the cored passage 70, is formed in the valve plug in the plane of the port opening 72. This latter port opening is likewise removed approximately 135 deg. from the port opening 72. Extending diagonally across the surface of the valve is a groove 77, the right hand end of which terminates substantially 45 deg. from the port opening 72. The angular extent of the groove 77 is approximately 90 deg., so that the other end of the groove terminates substantially 90 deg. from the port opening 75. It will be apparent that when the valve has been rotated through 45 deg. in a clockwise direction (looking at the valve in the direction indicated by the arrows in the section planes Figure 2) that the groove 73 will place the pipe 52 in direct communication with the pipe 55, and that the groove 74 will place the pipe 53 in direct communication with the pipe 54. As a result, there is a direct flow through the fluid motor 57. By rotating the valve through approximately 135 deg. in a counterclockwise direction from the position illustrated, it will be apparent that the port 75 will be brought into register with the pipe 55, and that the port 76 will be brought into register with the pipe 53. Simultaneously therewith, the left hand end of the diagonal groove 77 will be revolved into communication with the pipe 52, and the right hand end will be revolved into communication with the pipe 56. As a result, the flow will be in a reverse direction, the circulation being from the pipe 52 through the diagonal groove 57 to the pipe 56, thence through the motor 57, thence through the pipe 55, the port 75, the cored passage 70 and the port 76 to the pipe 53. For operating the valve, a shaft 78 is extended from the valve plug out through the closed end of the valve housing 69, where it is provided with a nut 79 for maintaining a snug taper fit of the valve plug in its valve housing. An operating handle 80 is pinned on the end of the shaft 78 on the outside of the end plate 5.

In Figure 5, I have illustrated a modified embodiment of fluid transmission mechanism for driving the washer cylinder wherein the reversals are effected by reversing gearing and are then transmitted to the washer mechanism through a synchronously operating fluid transmission system. In this form the motor shaft 7 carries a worm 136, which meshes with a horizontal worm wheel 137. The worm wheel 137 is mounted on a vertical shaft 138 which has bearing support in an upright bearing 139. This upright bearing 139 is supported upon the horizontal mounting plate 84, as is also the bearing bracket 141 for supporting the end of the motor shaft 7.

Mounted on frame members 142 adjacent the worm wheel 137 is a multi-cylinder pulsator 143. This multi-cylinder pulsator is adapted to be driven from the shaft 138 through the instrumentality of an automatic system of reversing gearing 144. The particular form of reversing gearing shown is disclosed in the patent to Phillips No. 1,077,748, issued November 4, 1913, and comprises two facing bevel pinions 145, and an intermediate bevel gear 146. The two bevel pinions 145 are journaled for idle rotation on a sleeve 147, which is mounted in axial alignment with the shaft 138 and is driven thereby. The pinions 145 are provided with projecting clutch lugs which are adapted to cooperate with a rocking cluch bar 148, pivoted between pivotal projections extending out from the sleeve 147. The rocking clutch bar 148 revolves with the sleeve 147 and is adapted to be rocked into and out of alternating clutching engagement with each of the bevel pinions 145. The rocking of the clutch bar 148 occurs periodically under the action of a stud 149 on the face of the large bevel gear 146, which stud is adapted to alternately engage each end of the clutch bar after a predetermined number of revolutions of the bevel gear 146.

The periodically reversing motion of the bevel gear 146 is transmitted through the crank shaft 151 into the interior of the crank case 152 of the multi-cylinder pulsator 143. This pulsator is constructed with preferably three cylinders 153, all of which radiate from the central crank case 152 in the same plane. The fluid pulsator 143 is a substantial counterpart of the fluid motor 154, a description of which will suffice to indicate the general construction of the pulsator 143. The fluid motor 154 comprises a circular crank case 155, which is mounted concentrically with the end trunnion of the washer cylinder 1, and which is supported upon the end of the tank 2 or upon a suitable supporting plate. Spaced equi-distantly about the crank case 155 and radiating therefrom are the three motor cylinders 156. Reciprocating in the cylinders 156 are pistons 157 from which extend connecting rods 158 having connection with a common crank in the crank shaft 159. The crank shaft 159 is mechanically coupled with the end trunnion of the washer cylinder 1 in an obvious manner.

In the heads of each of the cylinders 156 are provided ports which have connection through fluid pipes 161 with similar ports provided in the heads of the pulsator cylinders 153. Each of the pipes 161 is filled with oil to form a fluid transmission medium between the pistons of the pulsator 143 and the pistons of the motor 154. If desired, cushioning bubbles or pockets of air may be interposed in each of the fluid columns 161. In the operation of the system, the rotation of the pulsator shaft 151 in one direction produces successive outward strokes of each of the pulsator pistons progressively about the pulsator, thus pressure impulses are imparted to each of the oil columns in progressive sequence in the order of the rotation of the pulsator 143. These pressure pulsations in the fluid columns act upon the pistons 157 of the fluid motor in the same sequence as the rotation of the pulsator 143, and consequently a synchronous rotation is imparted to the motor 143 and is continued as long as the pulsator 143 continues to revolve in the same direction. Upon operation of the reversing gear mechanism 144, the direction of rotation of the pulsator 143 is changed and the sequence of the pressure pulsations in the fluid columns 161 is accordingly reversed. Immediately the progressive order of the inward strokes of the piston in the motor 154 is reversed and the motor consequently takes up a reverse direction of rotation. It will therefore be seen that the fluid motor 154 revolves in synchronism with the pulsator 143 at all times, revolving with the same rapidity of the pulsator 143 and reversing with the pump at each operation of the reversing gear mechanism 144. The provision of three cylinders in each of the pulsator and motor units prevents any possibility of either unit becoming stalled on dead center. To stop the operation of the washer mechanism there is provided a positive clutch 162, interposed in the motor shaft 7, which is made controllable through a foot actuated control lever 163.

I do not intend to be limited to the particular details shown and described, as they may obviously be extended and modified by those skilled in the art. It will be apparent that the transmission system may be adapted to other types of machines than the reversing cylinder type illustrated, such as to oscillating or dolly types of machines, and it will therefore be understood that in the appended claim the term "washer mechanism" is intended to include such other types.

I claim:

In hydraulic transmission mechanism for translating continuous uni-directional rotary motion into rotary motion changing from forward rotation to reverse rotation, the combination of a reversible fluid motor capable of continuous rotary motion in either direction by difference of fluid pressure, a source of power providing uni-directional rotary motion, a pulsator driven by said source of power, and means including a fluid column for transmitting difference in fluid pressure to said reversible fluid motor.

In witness whereof I hereunto subscribe my name this 18th day of February, A. D. 1920.

JOHN A. DIENNER.